Patented Nov. 28, 1933

1,937,472

UNITED STATES PATENT OFFICE 1,937,472

PROCESS OF PRODUCING FOAM

Richard Ericson, Chicago, Ill., assignor to United States Gypsum Company, Chicago, Ill., a corporation of Illinois No Drawing. Application November 25, 1929
Serial No. 409,761

2 Claims. (Cl. 252—6)

This invention relates to a foam or foam substance and the process for manufacturing the same.

The use of foam, and particularly stabilized foams in the manufacture of light-weight cementitious materials and other uses is rapidly becoming well known. One big disadvantage of the foams used heretofore has been that they are not freely flowing. Another disadvantage is that they will break down under certain fairly severe conditions, as when they are mixed with a mixture of calcined gypsum and water. A foam which is freely flowing and which will not break down under severe mixing conditions is highly desirable. It is the object of the invention to produce such a fluid foam which is stable and yet which will not break down under conditions of use.

By the method disclosed herein a fluid foam of fairly good stability can be made, or if desired a strongly reinforced foam with less fluidity may be made. It is essential however, that the stabilizing agent be a substance which will not prevent the formation of foam and which will not greatly thicken the foam solution at an elevated temperature, although it may be gelatinous at ordinary temperatures.

The stability and fluidity of a foam made in accordance with this invention varies in accordance with the treatment of the foam solution. A highly reinforced foam may be made from the solution by making into a foam while the solution is hot and holding the foaming mass hot during the dispersing of air to the solution. After the foaming mass is made it is permitted to cool which results in the reinforcing material forming a gel or partial gel, the strength of the foam formed depending upon the foaming agent used and upon the strength of the gel formed, which in turn depends upon the ability of the substance to gelatinize and upon its concentration. If a fluid foam is desired rather than a highly reinforced one, the process is slightly different. The process is started while the solution is hot, but it is permitted to cool during the process of manufacture.

The dispersing of the air into the mass when cooling interferes with the tendency of the mass to form a gel and causes the swollen particles to be broken up and suspended in the fluid. This results in a suspended fluid forming mass. While it is not necessary to disperse air into the solution while hot except only when a fairly stiff, highly reinforced foam is desired, a much higher volume is obtained when the solution is hot than while cold. If the solution is kept hot during the entire period of the introduction of air into the solution, a greater volume is obtained than if permitted to cool during the introduction of air into the solution. When the air is dispersed through a cold foam solution of this type a still greater reduction in the volume of foam obtained is encountered.

An example for the manufacture of a fluid foam of considerable stability is as follows: Three parts of ordinary corn starch are soaked in a small quantity of cold water, and are then added to enough hot water to make 100 parts of water for the whole. The resultant mixture is held at an elevated temperature until the starch particles have sufficiently swollen. Three-fourths part of soap bark is then mixed into the solution in the form of a thick paste. The solution while hot is then either beaten or subjected to a current of air which is bubbled into the solution from the bottom with agitation or beating of the solution. Little additional heat is supplied, for the heat from the solution is sufficient. The foaming substance formed is permitted to cool during the beating. A foam made in this manner increases in volume three to four times that of the original solution. A fluid foam may be made when the foam solution is cold by the above process, but the volume of foam obtained is not as great.

To make a stiff, greatly reinforced foam, four parts of starch are mixed with 100 parts of hot water and three-fourths part of soap bark and beaten into a foam in the same manner as described above, except that the solution and foaming mixture is kept hot during the introduction of air and in some cases hot air is used instead of cold to aid in maintaining the high temperature. After the dispersing of air throughout the solution, the foam is cooled, and the starch thickens due to gelatinization. By this means a stiff foam is obtained which will stand for several days without completely breaking down. This also gives a volume of foam three to four times that of the original solution. It may be noted that the volume of foam obtained will be decreased as the concentration of the reinforcing material is increased, but the stability is increased at the same time.

The above methods are not limited to corn starch, as many other materials possessing similar characteristics may be used, for example starch from potatoes or arrow root, materials high in starch as tapioca or sago flour, certain forms of carbohydrates, and other organic materials such as glue, gelatin and certain seaweeds.

However, the use of starch is preferred due to its cheapness. While soap bark has been specified as the foaming agent in the above examples, other such agents may be used such as resin soap and other soaps possessing foaming ability, retarder, yucca root and many others.

One of the uses of this type of foam is the mixing with cementitious materials like calcined gypsum to obtain a reduction in weight. In the manufacture of a gypsum tile or wallboard having paper sheet liners from calcined gypsum and water, a lighter product can be obtained after drying if a foam is mixed in with the calcined gypsum-water mixed before it is set. The fluid foam of the type described in this application is highly desirable for this purpose, because it will mix in more readily and being reinforced will not readily break down. The starch used in the foam also creates a better bond between the paper cover sheets and the core of gypsum boards when the cementitious composition is used for this purpose.

I would state in conclusion that while the described examples constitute a practical embodiment of my invention I do not wish to limit myself precisely to these details, since manifestly, the same can be considerably varied without departing from the spirit of the invention as defined in the appended claims.

Having thus described my invention, I claim as new and desire to secure by Letters Patent;

1. The process of producing a stable foam capable of incorporation with cementitious slurries without breaking down which comprises mixing starch with cold water and then adding to the mixture sufficient boiling water to raise the temperature of the mixture to the gelatinizing point of the said starch, dissolving soap bark in the starch solution while the latter is hot, and dispersing air into the resultant hot mixture to form a foam therein, and then allowing the complete mixture to cool.

2. The process of producing a stable foam capable of incorporation with cementitious slurries without breaking down which comprises mixing from three to four parts of cornstarch with cold water until the same is uniformly dispersed therein, then adding to the mixture thus obtained sufficient boiling water to bring the total amount of water up to 100 parts and the temperature up to above the gelatinizing point of said starch, thereby producing a starch paste, adding to said paste a solution containing soap bark in an amount not exceeding one-fourth the amount of the starch used, and thoroughly mixing the ingredients thus added and then introducing air into said mixture while thoroughly agitating the latter so as to produce a stable freely flowing foam having a volume at least four times as great as the liquid from which it is produced.

RICHARD ERICSON.